United States Patent
Milic-Frayling et al.

(10) Patent No.: US 8,914,397 B2
(45) Date of Patent: Dec. 16, 2014

(54) RICH-CONTEXT TAGGING OF RESOURCES

(75) Inventors: Natasa Milic-Frayling, Cambridge (GB); Gavin Smyth, Huntingdon (GB); Eduarda Mendes Rodrigues, Vila Nova de Gaia (PT); Gabriella Kazai, Bishops Stortford (GB)

(73) Assignee: Microsoft Corporation, Redmond, WA (US)

( * ) Notice: Subject to any disclaimer, the term of this patent is extended or adjusted under 35 U.S.C. 154(b) by 1115 days.

(21) Appl. No.: 12/328,120

(22) Filed: Dec. 4, 2008

(65) Prior Publication Data

US 2010/0146015 A1    Jun. 10, 2010

(51) Int. Cl.
*G06F 7/00*      (2006.01)
*G06F 17/00*     (2006.01)
*G06F 17/30*     (2006.01)

(52) U.S. Cl.
CPC .... *G06F 17/30115* (2013.01); *G06F 17/30038* (2013.01)
USPC ............................. 707/767; 707/768; 707/770

(58) Field of Classification Search
USPC ................... 719/311; 235/375; 707/513, 748; 715/763, 205; 709/202, 228; 705/26, 705/7.33; 725/133
See application file for complete search history.

(56) References Cited

U.S. PATENT DOCUMENTS

| | | | | |
|---|---|---|---|---|
| 7,185,274 | B1 * | 2/2007 | Rubin et al. | 715/205 |
| 7,398,527 | B2 * | 7/2008 | Hamdan et al. | 719/311 |
| 7,424,439 | B1 * | 9/2008 | Fayyad et al. | 705/7.33 |
| 7,774,713 | B2 * | 8/2010 | Mital et al. | 715/763 |
| 7,797,381 | B2 * | 9/2010 | Zhang et al. | 709/204 |
| 7,899,915 | B2 * | 3/2011 | Reisman | 709/228 |
| 8,271,501 | B2 * | 9/2012 | Buccella et al. | 707/748 |
| 8,280,944 | B2 * | 10/2012 | Laadan et al. | 709/202 |
| 8,640,183 | B2 * | 1/2014 | Reisman | 725/133 |
| 2002/0065851 | A1 * | 5/2002 | Watson et al. | 707/513 |
| 2003/0160609 | A9 * | 8/2003 | Snowberg et al. | 324/300 |
| 2005/0033657 | A1 * | 2/2005 | Herrington et al. | 705/26 |
| 2005/0092825 | A1 * | 5/2005 | Cox et al. | 235/375 |
| 2007/0282657 | A1 | 12/2007 | Hupfer et al. | |
| 2007/0299631 | A1 | 12/2007 | Macbeth et al. | |
| 2007/0299712 | A1 | 12/2007 | Macbeth et al. | |
| 2007/0299713 | A1 | 12/2007 | Macbeth et al. | |

(Continued)

OTHER PUBLICATIONS

"A New Prototype: Research Desktop", retrieved on Oct. 1, 2008 at <<http://lewisshepherd.wordpress.com/2008/09/25/research-desktop/>>, 4 pages.

(Continued)

*Primary Examiner* — Susan Chen
(74) *Attorney, Agent, or Firm* — Steve Wight; Judy Yee; Micky Minhas

(57) ABSTRACT

Tagging of resources in order to associate them is described. In an embodiment it is possible to assign tags to resources or switch between resources with different tags, in the context of current work being undertaken by a user. For example, from a single application window that is currently used, a user is able to switch to other resources by tag in an embodiment. Different embodiments illustrate how tags may have multiple purposes and those purposes may evolve thus enabling associated resources to be exposed in different ways. In some embodiments rich metadata about tag usage and/or the use of resource associated with a tag is stored and used to provide additional functionality. Examples are described in which persistence of resources associated with tags is provided and may involve representation of resources such as by duplication of files or by creating alternative representations of resources.

20 Claims, 11 Drawing Sheets

(56) References Cited

U.S. PATENT DOCUMENTS

| | | | |
|---|---|---|---|
| 2007/0299795 | A1 | 12/2007 | Macbeth et al. |
| 2007/0299949 | A1 | 12/2007 | Macbeth et al. |
| 2007/0300174 | A1 | 12/2007 | Macbeth et al. |
| 2008/0097975 | A1* | 4/2008 | Guay et al. .................. 707/4 |
| 2008/0155430 | A1 | 6/2008 | Prager et al. |
| 2008/0162505 | A1 | 7/2008 | Hill et al. |

OTHER PUBLICATIONS

Bannon, et al., "Evaluation and analysis of users' activity organization". Proc. CHI 1983, ACM Press (1983), 54-57.

Bardram, et al., "Support for activity-based computing in a personal computing operating system", In Proc. CHI 2006, ACM Press (2006), 211-220.

Cutrell, et al., "Fast, flexible filtering with phlat". In Proc. CHI 2006, ACM Press (2006), 261-270.

Czerwinski, et al., "A diary study of task switching and interruptions". In Proc. CHI 2004, ACM Press (2004), 175-182.

Dourish, et al., "Presto: An Experimental Architecture for Fluid Interactive Document Spaces". ACM Trans. Comput.-Hum. Interact. 6,2 (1999), 133-161.

Gentner, et al., "The Anti-Mac Interface". Commun. ACM 39,8 (1996), 70-82.

Golder, et al., "Usage Patterns of Collaborative Tagging Systems". Journal of Information Science 32,2 (2006), 198-208.

Gonzalez, et al., "Constant, constant multi-tasking craziness": Managing multiple working spheres. Proc. CHI 2004, ACM Press (2004), 113-120.

Henderson, et al., "Rooms: the use of multiple virtual workspaces to reduce space contention in a window-based graphical user interface". ACM Transactions on Graphics 5,3 (1986), 211-243.

Hsieh, et al., "A web-based tagging tool for organizing personal documents on PCs". In CHI 2008 Workshop on Personal Information Management (2008).

Iqbal, et al., "Disruption and recovery of computing tasks: field study, analysis, and directions". In Proc. CHI 2007, ACM Press (2007), 677-686.

Jones, et al., "Don't take my folders away!: organizing personal information to get things done". In Proc. CHI 2005, ACM Press (2005), 1505-1508.

MacIntyre, et al., "Support for multitasking and background awareness using interactive peripheral displays". Proc. UIST 2001, ACM Press (2001), 41-50.

Moore, et al., "Next Generation Activity-Centric Computing", retrieved on Oct. 1, 2008 at http://domino.watson.ibm.com/cambridge/research.nsf/c9ef590d6d00291a85257141004a5c19/7750f9b4eb1ed61685257233300710ce2/$F1LE/TR2006-3.pdf>>, IBM Software Group and IBM T.J. Watson Research, 4 pages.

Oleksik, "Activity-Based Computing and Research Desktop", Literature Review, Microsoft Research.

"Research Desktop Activities User Guide". Microsoft Research, Cambridge, UK. Jun. 2008.

Robertson, et al., "Scalable Fabric: flexible task management". In Proc. AVI 2004, ACM Press (2004), 85-89.

Robertson, et al., "The Task Gallery: a 3D window manager". Proc. CHI 2000, ACM Press (2000), 494-501.

Smith, G, "GroupBar: The TaskBar evolved". Proc. OZCHI 2003.

Tashman, C. "WindowScape: a task oriented window manager". Proc. UIST 2006, ACM Press (2006), 77-80.

Thomas, "A General Inductive Approach for Analyzing Qualitative Evaluation Data". American Journal of Evaluation 27, 2 (2006), 237-246.

Voida, et al., "Giornata: Re-envisioning the desktop metaphor to support activities in knowledge work". Demo at UIST 07.

* cited by examiner

RICH-CONTEXT TAGGING OF RESOURCES

BACKGROUND

Tagging resources may be particularly useful in activity-based computing and digital resource management.

Traditionally computers (including PCs, laptops, mobile telephones, PDAs and the like) have been configured to support the user in the serial use of applications. For example, a user may be writing a document, and at the computer system level editing the document is a discrete and solitary task. However, the relationship of the document to the larger activity which the user is undertaking (for example, compiling a literature review) is not taken into account by the computer system. It is up to the user to arrange windows, start and stop applications as necessary and search for relevant information stored on the local machine and elsewhere.

Activity management is known in the field of "activity-based computing" (ABC). Activity management can be seen as a response to the traditional application and file-centered computer paradigm. Activity management systems are computer systems which are designed to support humans who are working on activities comprising a plurality of tasks where a task may be defined from the system's point of view as discrete, solitary and application bound. Activity management systems seek to enable a user to associate individual elements of an activity in such a way that those elements can easily be recalled. Driven by work place observations illustrating how users are often required to switch tasks many times throughout the working day, such systems also seek to enable a user to fluidly switch between activities and their associated resources.

Some previous approaches to activity management have involved the grouping of windows that are associated with an application or services and providing access to the content that the user is using while performing an activity. For example, tasks are organized by dragging a window tile onto another window tile, which then associates the windows on a taskbar. In this approach a user is able to arrange the order of windows within each group. Task switching occurs by clicking between groups located on the taskbar.

Other approaches have tried to make use of human spatial memory. For example, a user is able to define a primary focal area on a desktop (this may be the size of one screen on multi-screen displays). Within this focal area, windows are displayed in full size, while other running windows are shrunken to the periphery of the screen. The aim of this is to eliminate the need for minimizing windows, and make use of the spatial memory of the user to locate windows relating to given tasks. The periphery of the screen may be used to spatially arrange windows into activities (i.e., groups of tasks) which may be named, and it is through this that activity management is enabled. Maximizing a window returns it to its previous state in the focal part of the screen, minimizing it returns it to the last place in the periphery. Tasks can be switched by clicking on them, which causes the windows to return to their last focus position.

So called "virtual desktop" approaches are also known. These enable users to create multiple virtual desktops (called rooms in some systems), in order to arrange activities via related windows. Each virtual desktop may be named, and each room may contain doors to other rooms, to move windows from one desktop to another.

Tagging resources may also be useful in the field of digital resource management. In the computing environments, work is performed by receiving, accessing, creating, and distributing digital resources. Digital resources need to be persisted in order to be used or provided to others for use. Persistence of resources is facilitated by saving digital files by the worker or automatically by the computing system in a local computing environment or remote data stores. In some instances the computing system or a service stores the content in a proprietary data format in a proprietary data store, e.g., e-mail inbox and folders, Web sites, a Web browser cache and bookmarks, etc. Access to digital content may be facilitated by search on the file identifiers, e.g., file name, or properties, e.g., file type, or content features, e.g., keywords contained in the file content. In some systems the user can assign keywords or tags to the file and the system can provide access to the files based on the user assigned tags. Some PC desktop applications provide facilities for tagging resources during the resource use, e.g., by accessing the property information provided by the system and adding the keywords to describe the content or additional tags to attach to the file. In some instances both the keywords and tags can be provided by the authors or consumers of the content and they may be used differently by the applications and services in the computing environment that are processing the content.

The embodiments described below are not limited to implementations which solve any or all of the disadvantages mentioned herein.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Tagging of resources in order to associate them is described. In an embodiment it is possible to assign tags to resources or switch between resources with different tags, in the context of the current work being undertaken by a user. For example, from a single application window that is currently used, a user is able to switch to other resources by tag in an embodiment. Different embodiments illustrate how tags may have multiple purposes and those purposes may evolve thus enabling associated resources to be exposed in different ways. In some embodiments rich metadata about tag usage and/or the use of resource associated with a tag is stored and used to provide additional functionality. Examples are described in which persistence of resources associated with tags is provided and may involve representation of resources such as by duplication of files or by creating alternative representations of resources.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
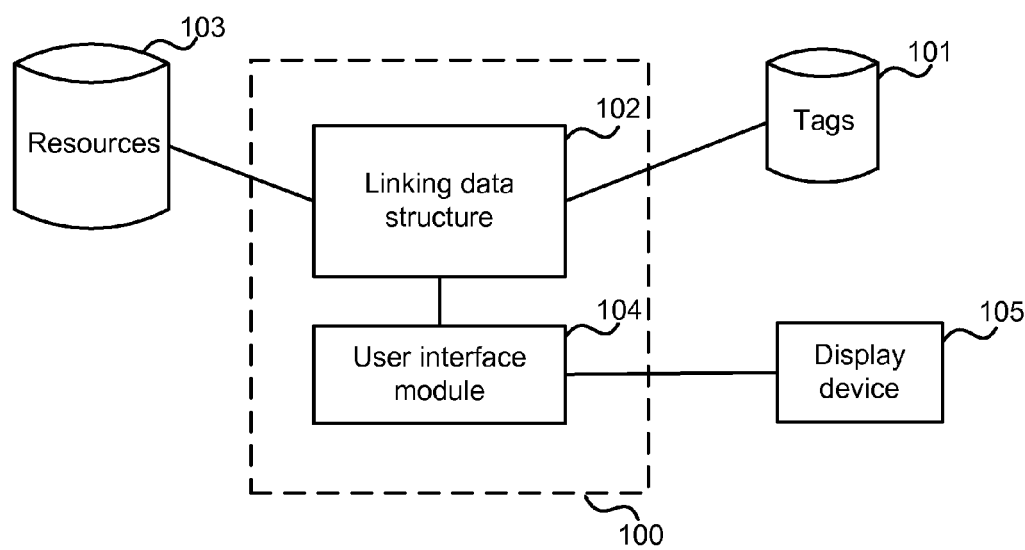
FIG. 1 is a schematic diagram of an activity management system.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an activity management system, the system described is provided as an example and not a limitation. As those skilled in the art will appreciate, the present examples are suitable for application in a variety of different types of systems where resources are tagged.

The term "resource" is used herein to refer to any item (or part of an item, or a composition of items) needed for use in an activity. A non-exhaustive list of examples is: document, email, email thread, text snippet, image, video clip, audio file, spreadsheet, file, a tangible object with a unique digital reference, window, web page, URL, a contact from an address list, a code fragment, a system folder, an activity (for example, an activity may be a sub-task of a larger activity). Resources within each activity may be heterogeneous meaning that the resources are of different types. For example, a word processing document and a spreadsheet document may be heterogeneous resources.

The term "state information" is now explained with respect to resources. A given resource has one or more states, one for each activity the resource is a member of. Suppose a resource is a member of activity A. The state of that resource for activity A then comprises information about the display of that resource the last time a user worked on activity A. However, state information need not just be the state of the application used to display the resource. For example, the state information may comprise context information about how, when or where the resource has been accessed and used for example. The context information could be information about other applications currently running or about remote data sources being accessed. In some cases, the state information may comprise information about whether the resource was opened in an application window or not, whether it was visible or minimized, and the position of the application window on the display device the last time the resource was used in activity A. State information may also comprise scroll location, current selection range, a history of resource change events such as saves, copy or move actions, print actions, opening, closing. The state information may also comprise a type for the resource and an address of the resource. The type indicates a software application associated with the resource. For example, the type may be "word processing application" for a text document. The address of the resource is any unique identifier for the resource which the associated software application can use to display the resource, for example, by opening it in a window.

The term "activity" is used herein to refer to a task or group of tasks related to an overall purpose. An activity can be of any granularity, from a minor task to a large and complex project, and of any duration. An activity has one or more activity tags and a state associated with it. The state of an activity comprises the individual states of each associated resource and, optionally, for each resource, the identity of a software application used to display that resource. The state can also include parameters that describe relationship among resources associated with the activity as well as relationship with other activities. For example, an activity may be linked to or comprised by other activities. The relationships can be specified by the user through user manual annotations such as drawing to specify links and groupings, or generated automatically through system computations.

The term "tag" is used to refer to a marker or label for classifying or describing a resource. A non-exhaustive list of examples is: a color, a piece of text, a symbol, an icon, a sound, and combinations of such examples.

The term "activity tag" is used to refer to a tag for labeling one or more resources to be used for a particular purpose. For example, activity tags can be associated with the resources relevant to an activity of the user, and may support resource grouping and classification.

There is a need to provide activity and content management systems which support prolonged and flexible work. Activities, especially those carried out by knowledge workers, may be done over a prolonged period of time, such as several weeks, months or years. This may require that the worker re-organizes the resources associated with activities without actively using them through the corresponding software application or service. Such is the situation when resources are scattered across the file system and application stores and the user wants to connect them for future easy access before starting to work with individual resources. This should not necessarily require copying of resources to a designated space, but rather linking the resources within their original location, e.g., within the folders of the file system or within other organizational structures, across computing systems and services, such as bookmarks to Web pages, e-mail folders, etc. However, at present, there is no easy way to keep the relevant resources required for an activity together and to easily resume work on the activity.

There is a need to provide activity management systems which support less structured workflows that involve multiple applications and resources. In contrast to workflows of well structured business processes, knowledge workers may vary significantly in the way they conduct their work. The material they collect and author may be related to a short-lived project or may be an integral part of a life-long work. Due to the nature of their work, knowledge workers often need to gather resources before a task is completely formulated and a clear structure of content organization can be formalized (e.g., the structure of resource organization may evolve as the task develops).

There is a need to enable multiple tasks to be performed in parallel or in rapid succession. Switching between ongoing tasks however, often has significant overhead costs associated with locating and accessing the necessary resources, remembering the last actions in a chain of logic, recalling the context of the work and so on. In order to reduce the overhead and increase the productivity, it is beneficial to provide access to relevant resources, in the same or related activities, from the context of the currently used resource and application window. It is also beneficial to enable the workers to re-group resources across activities while preserving the context of their current work.

There is a need for flexible resource/data management. Most existing designs of computer systems, including the PC environment, are based on distinct application-bound functions such as document authoring or email usage. Furthermore, data associated with different applications may reside in different data stores. For example, a typical PC environment may involve many data stores: for example, local file system, remote and/or local email store, and content residing within intranets or the Internet are typical. The user has to manage each of them separately in order to access all the information that may be relevant to a task.

FIG. 1 is a schematic diagram of an activity management system 100 which may be provided using a computer such as a personal computer (PC), laptop, PDA or other computing device. The computer has a conventional operating system of any suitable type which provides a windows-based platform that may be used by one or more software applications also provided on the computer. A user may use those software applications to carry out tasks which are part of activities. The activity management system comprises a linking data structure 102 maintained in memory. This data structure stores references to resources which are for example, documents, parts of documents, web pages, emails, images or other resources. A definition of the term "resource" is given above. The references may be addresses, links, URIs, file paths or other indications of identity or locations 103 where resources are stored. The data structure 102 also associates one or more tags with each resource. The tags themselves may be stored at another location 101 which is in communication with the data structure 102 or may be integral with the activity management system 100. The tags may be of multiple types and information about the type of each associated tag may be stored at the data structure. More detail about tag types is given below. In addition, metadata about tag types and/or resources may be stored as described below. For each resource and associated tag, state information is stored comprising information about a context in which the resource has been used.

In some embodiments the activity management system 100 also stores state information for each activity, historical records of user interaction with each activity and related data, and optional freeform user supplied annotations. For example, the annotations may be text snippets or drawings. The state information for each activity comprises state information for resources in each activity. The state information, historical records and related data may be stored together with the linking data structure 102 at the activity management system 100 or at any other location accessible to the activity management system.

In some embodiments, tags are automatically assigned to resources by the system itself according to pre-specified rules, criteria or in any other suitable manner. It is also possible for user input to be used to facilitate assignment of tags to resources as described below. In addition, combinations of these two approaches may be used.

The activity management system 100 also comprises a user interface module 104 arranged to provide a graphical user interface at a display device 105. The graphical user interface is arranged to allow users to access resources using tags as described in more detail below. In embodiments the graphical user interface is also arranged to enable users to assign one or more tags to a resource and to remove tags from resources. It also enables users to switch to tasks on related resources that share the same tag. The display device 105 is of any suitable type for providing a graphical user interface. For example, it may comprise a display screen, keyboard and mouse or an interactive touch screen. In some examples a speech interface is provided to enable resources to be tagged.

Once tags are associated with resources it is possible for the activity management system to quickly and simply retrieve resources associated with the same tag. For example, a user is able to quickly access all resources he or she may have tagged for work on project A. If the user needs to stop work on project A and resume work some time later, it is simple, fast and efficient for the user to access those resources using the activity management system.

Also, if a user needs to rapidly switch between project A and project B for example, this is possible using the activity management system, once resources for those projects are appropriately tagged. Furthermore, users may switch between resources associated with different activities, without requiring to switch between activities prior to this. Users thus may work in multiple activities at the same time.

Provision is made to enable users to tag resources and to remove tags from resources. In addition, resources may be moved between activities by a drag and drop facility. Provision is also made to enable users to quickly and simply view tags, access resources using tags, create tags, delete tags, edit tags and optionally organize tags. The methods provided for achieving this are lightweight in that minimal effort, skill and user action is required on behalf of the user. In addition, the use of tags is flexible because it does not limit the user to a hierarchical file structure and by providing tag facilities the user gains control. The mechanisms provided herein to enable users to create an activity, switch between activities and access related content are designed to be simple and natural processes which minimize users' overhead in handling multiple tasks and activities.

The use of tagging enables resources to be easily gathered even if those resources are distributed across different storage silos. Also, the tags may be used as a temporary place for collecting information associated with transient or less well-defined activities. The activity management system may be used to provide a reminder function of tasks and to prioritize tasks and projects. In addition, it is possible to share and persist the rich context related to a particular activity.

Whilst the system for resource tagging of FIG. 1 is described in relation to activity management, the tagging system is generic and may be used by users for multiple purposes. A non-exhaustive list of examples is:

Tagging resources associated with an ongoing activity Creating placeholders for resources associated with an anticipated task (but not including any resources yet)

Creating a place for bookmarks to documents that may be on the same theme or used for a particular purpose but scattered across the file systems Temporarily referring to documents, especially online resources, that one may not want to download and save or include in the browser bookmarks, either because the bookmarks do not provide enough context—e.g., cannot be used to refer to other objects but online content, or are difficult to access.

Serving as to-do lists and reminder of actions to perform

Classifying or describing groups of resources and exposing them for easy access.

Digital files cannot exist and be used without being stored somewhere, in the file system, within an application store, within a service data store—e.g., mail exchange server, etc., or distributed Web environment. Thus, traditionally, managing user tasks was almost identical with the storing and organizing digital resources. However, as access is provided to services that take care of the storage, there is a trend towards referring to items in these data stores rather than saving them. Thus, the management of digital content is becoming separated from the actions/activities that users perform with the data resources.

Furthermore, the digital storage as in the file system, may reflect the initial tasks and initial intention of the user for storing the files. However, the user may need to reuse resources subsequently as the task evolves or for use in other tasks. Thus the organization structure of the storage becomes a limiting factor in the user productivity—they have to browse the organization structure, such as an hierarchical file system, that may not be optimal for the task at hand. Therefore, it is important to surface these resources in a way that supports user needs for quick access to them. This is provided by the embodiments described herein through the use of tags. These embodiments are not restricted to the individual PC environment but can be used across computing environments.

Activity management has traditionally dealt with the problem of multiple applications and multiple windows being used in the desktop environment simultaneously, thus causing issues with switching between windows and resuming different tasks.

However, as we look at the individual digital resource as stored in the file system or other repository, and perhaps associated with an activity tag, it is realized that the typical storage system is completely unaware of the usage of the resource. Traditional systems for managing files, such as the file system, have minimal information about the usage context. This is addressed herein by using state information and context information.

The system of FIG. 1 provides a facility for associating resources through tagging which optionally provides this functionality
  across applications
  across computing environments
  without having to open an item and tag it within the corresponding application (that provides access to the resource)—e.g., by associating the tag to the file in the file system manager or with the file identifier (pointer/shortcut, URL) in the tag manager
  from within the context of the particular application/window that the user is currently using
and which enables accessing and managing tags and references to associated resources
  from a dedicated, centralized tag management facility and/or
  in a distributed way, from within the context of the current application through a dedicated extension of the window or the application itself.

Tags can be of multiple types. For examples, the types may be related to activities, future tasks, transient content gathering, reorganizing views on the content storage, e.g., logical views of the stored content by date, by author, by event, by purpose, etc.

The type for a tag can be implicitly or explicitly defined by the user. For example, a tag can have multiple types if needed. The types can be provided by the system, e.g., as a taxonomy of types from which the user can select or the system can automatically assign types if required. It is also possible for the types to evolve over time, and be defined by the user or by the system (e.g., by recognizing patterns in the usage from usage logs). In some embodiments the system can use the tag type to provide different handling and presentation of tags (e.g., activity tags and associated resources may be automatically stored, or showed in a separate list of tags).

As mentioned above tag metadata may be stored with different metadata for different tag types. For example, activity tags may include the history of the evolution of the tag name as the activity changes. Thus an activity tag is not completely defined by the 'name' of the tag but other aspects, e.g., the set of resources associated with the evolving tag, which may be also be changing as new resources are added and previous ones removed. Another example involves content tags describing a resource which may include information about the context in which the content tag was assigned, including the state of the application associated with the content at the time.

In the embodiments described herein, resources associated with the tag may be defined by the window and application that is exposing them at the time and by the identifiers of their storage location.

Certain resources associated with particular tags or tag types may be persisted. For example, resources may be stored at alternative storage that is specific to the tag/tag type. For example, tags that are marked as 'shared' may be processed by the system so that it replicates the associated resources and their representations in multiple storage locations to provide broader access. It is also possible to provide a specialized service by which particular tagged resources and their representations are accessed remotely, without having to run applications locally or have local storage of resources and their representations.

In some examples certain resources are persisted and tags or tag types are used to select those resources to be persisted. The persistence mechanism may involve duplicating the resources or creating an adequate representation of part of or all of the resource. For a web page for example, multiple representations may be created. These may comprise an image of the web page including dynamic content displayed at the time of page viewing. The representations may also comprise a sequence of web page images that have changed during the time the URL was viewed.

Example user interface displays provided by the user interface module 104 are now described with reference to FIGS. 2 to 6. In these examples the tags are referred to as activity tags since in these examples the tags are used to label resources according to activities those resources are to be used in. However, this is not essential, the tags could be used to label resources according to other classification schemes.

Figure 2:
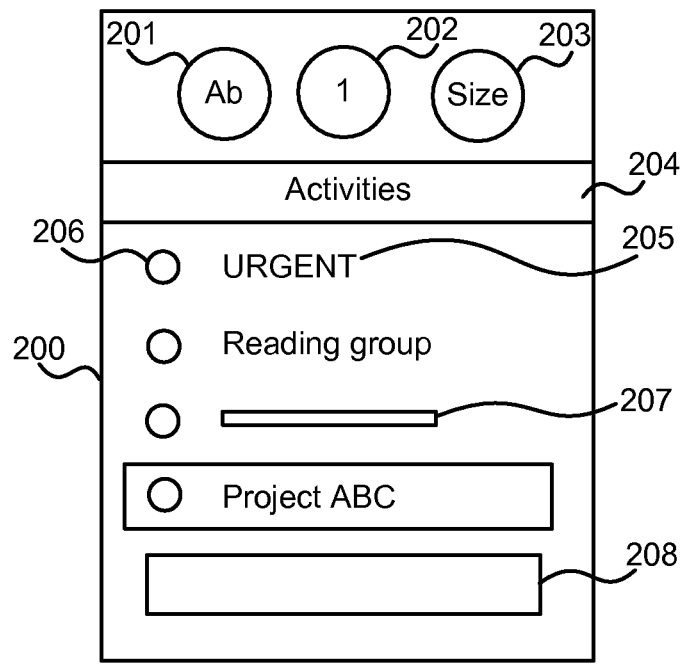
FIG. 2 is an example of a user interface activity list window.

FIG. 2 is an example of an activity list display window 200 provided by the user interface module 104. All the available activity tags 204 are listed and in this example there are four activity tags: URGENT 205, Reading group, bar symbol 207, and Project ABC. One of the activity tags 207 is a symbol which may be a particular color and the other three are text strings. It is also possible to use activity tags that are colors, icons or other markers, or a combination of one or more of these. The activity tags in the list 200 may be ordered using the three buttons 201, 202, 203 in the title bar of the window 200. Alphabetical ordering is given using button 201, temporal ordering is given using button 202 (for example most recent items first) and size ordering is given by button 203. Other ways of ordering and displaying the list may be provided. A user is able to rename or delete an activity tag from the list 200. For example, this can be achieved by right-clicking on the appropriate activity in the list. A button 206 may be provided in front of each activity tag which, when selected, activates or deactivates the activity—i.e., opens or closes, respectively, all of the associated resources within their appropriate application windows. A text box 208 at the bottom of the window 200 enables a user to enter a new activity tag or to find an existing one. As a user types in the text box the list of activity tags is filtered to show only those activity tags whose tag contains the search text.

Figure 3:
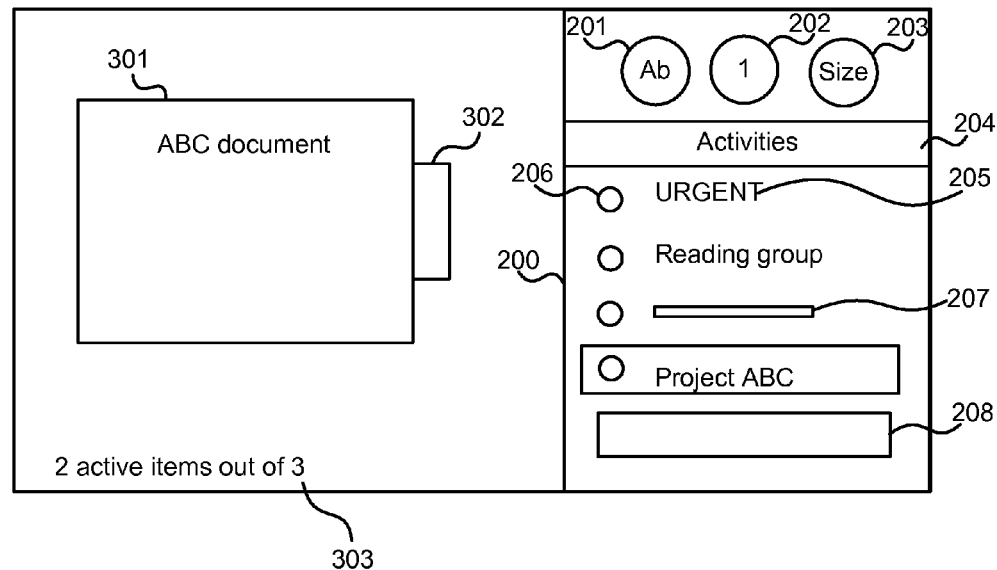
FIG. 3 is an example of a user interface activity carousel window displayed next to the activity list window of FIG. 2.

FIG. 3 is an example of a carousel window 300 adjacent to an activity list window 200. As a user moves his or her mouse over an activity tag in the list window 200, the carousel window 300 slides out to the left displaying thumbnails of associated active resources. For example, active resources are those that were opened in a window the last time a user worked on the particular activity. That is, thumbnails 301, 302 of all resources tagged with the selected activity tag and with state information meeting specified criteria are shown in the carousel window 300. The thumbnails 301, 302 may be screen shots captured by the activity management system the last time a user worked on the particular item. However, this is not essential. The thumbnails may be dynamically generated or may be preconfigured.

A carousel window is one embodiment of visualizing an activity and associated resources, which displays each of a plurality of items in turn, as if the items were on a carousel being rotated. The rotation of the carousel may be automatic or may be controlled by user input such as rolling a roller on a mouse. If a user selects a thumbnail in the carousel window the resource corresponding to the thumbnail is opened and displayed at the display device 105. The carousel window may give information 303 about the number of resources tagged with the selected activity tag and the proportion of those resources which are active (according to the stored state information). It may also display metadata associated with a resource when its thumbnail is on the foreground. In some embodiments a "peek" function is provided bringing a window to the foreground while hovering over its associated thumbnail, but not resuming the window unless clicked on by the user.

In some embodiments the carousel window is used to display the most frequently accessed resources from the activity, considering the whole usage history, rather than the active resources.

Figure 4:
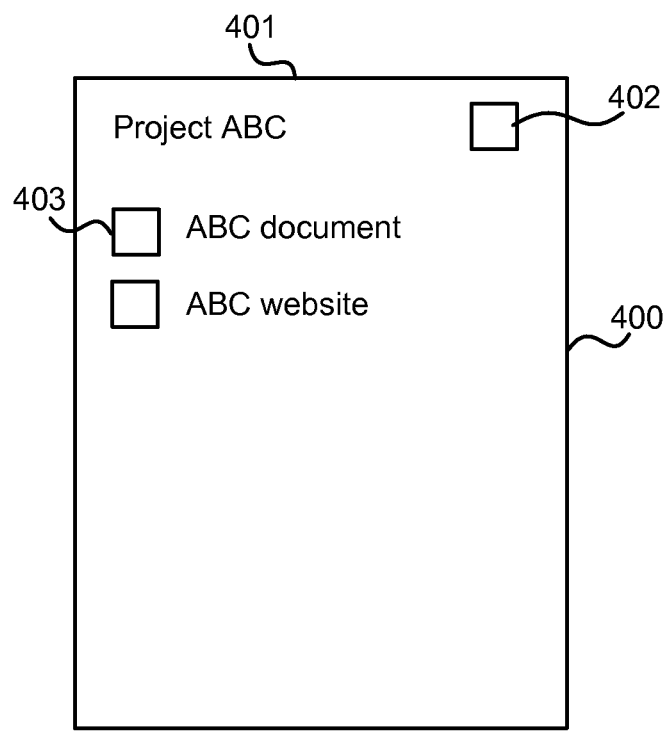
FIG. 4 is an example of an object list window.

FIG. 4 is an example of an object list window 400. This type of object list window 400 is presented when a user selects an activity tag in the activity list window 200. It lists all the resources associated with the selected activity tag. In the example shown in FIG. 4 the selected activity tag is "Project ABC" 401 and the list of resources for that activity tag has only two items: ABC document and ABC web site. Adjacent to each resource name in the list is an icon 403 indicating the type of the resource (for example, the software application used to create it). The object list window may be set to be on show permanently or to slide out of view after a few seconds. An icon 402 may be selected to toggle between these modes. A user may select a resource from this list in order to open that resource or remove the activity tag from the resource.

Figure 5:
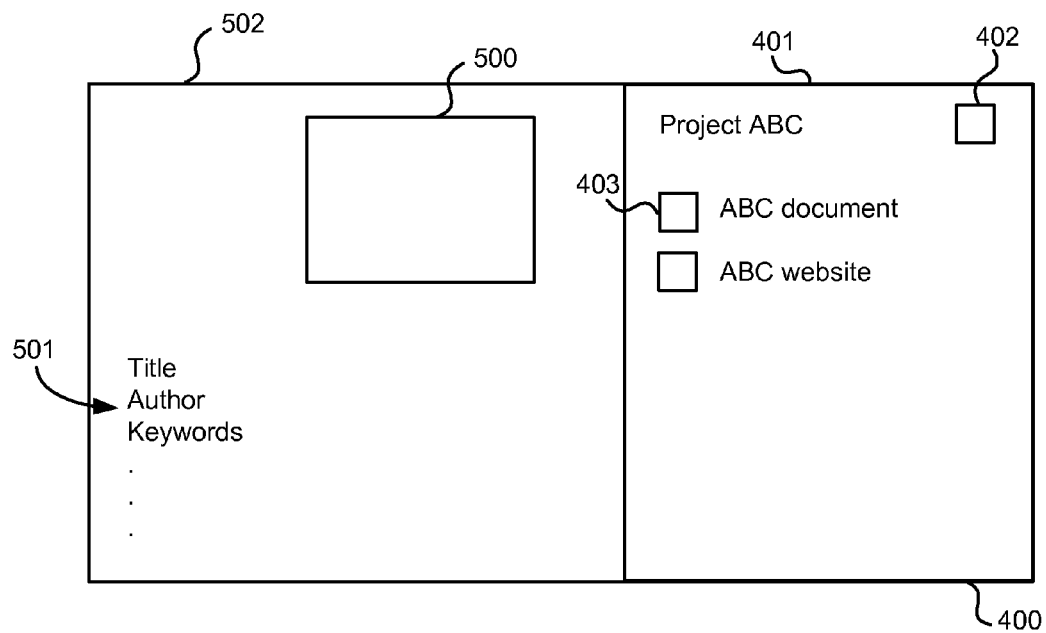
FIG. 5 is an example of an object thumbnail and metadata window displayed next to the object list window of FIG. 3.

FIG. 5 is an example of an object thumbnail and metadata display 502 which may be presented adjacent to the object list window 400. For example, moving a mouse over a resource name in the object list may cause the object thumbnail and metadata display 502 to pop out. A thumbnail 500 of the selected resource is shown together with metadata about the selected resource. For example, the metadata may comprise the title of the resource, authors of the resource, keywords related to the resource, a creation date of the resource and so on. The metadata may also provide links to the actual resource location, or to other related activities. Furthermore, metadata can be edited directly in this window. If a user selects the thumbnail 500 this causes the resource to be opened in its default software application. That is, each resource has a specified default software application which is usually the software application which was used to create that resource (although this is not always the case).

Figure 6:
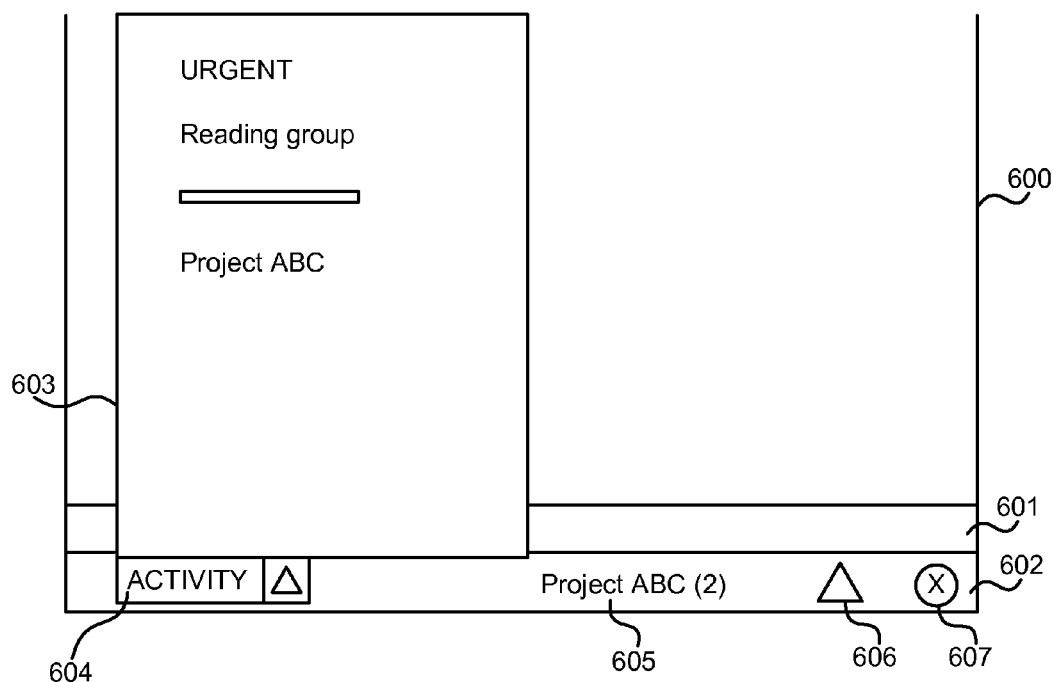
FIG. 6 is an example of a toolbar attached to the bottom of another window.

FIG. 6 shows an example of a toolbar 602 provided by the user interface module 104. In some embodiments the toolbar provides functionality to enable users to link resources to existing or new activity tags. In some cases it also provides the ability to enable users to remove activity tags from resources and to quickly access other documents which have the same activity tag. The toolbar 602 may be arranged to be presented below or at the bottom of an application window 600 which has its own toolbar 601 as illustrated in FIG. 6.

The toolbar presents an icon 604 which when selected causes an activity-combo box display 603 to appear. This activity-combo box lists the activity tags and any of those tags which are already associated with the resource being displayed in the application window 600 are greyed out. Also, activity tags which are already associated with the resource being displayed in the application window 600 are listed on the toolbar itself. For example, in FIG. 6 a resource tagged with the Project ABC tag is being displayed in application window 600. The tag "Project ABC" thus appears on the toolbar at 605.

A user may operate the toolbar, such as that of FIG. 6, to access resources related to the current activity or to a different activity. For example, a user may select an activity tag from the list displayed in the activity-combo box 603. This causes a list of all resources associated with that activity tag to be presented. A user may select any of the resources in this list in order to open that selected resource in its default application.

A user may click on an icon 606 next to an activity tag 605 on the toolbar, the tag 605 being associated with the resource currently open in the application window 600. This displays a list of resources associated with the same activity tag 605 as the resource being displayed in application window 600. A user may select any of these resources in order to open it.

In order to remove an association between a resource and an activity tag a user may select an icon 607 on the toolbar.

In order to associate an existing activity tag with the resource displayed in the application window 600 a user may simply select that activity tag from the list of activity tags in the activity combo-box or the activity list window 200. In order to associate a new activity tag with the resource displayed in the application window 600 a user may type a new activity tag into a text box on the toolbar 602. Once a new association has been made, details of the added tag appear on the toolbar.

The graphical user interface provided by the user interface module 104 is arranged to enable activity tags to be created in a variety of ways. For example, a user may type text for a new activity tag into the text box on the activity list window 200 as mentioned above. It is also possible to use the text box on the toolbar and this is also described above. To create activity tags that comprise icons or color selections further graphical user interface options are provided.

In some embodiments it is possible to create a new activity tag by dragging and dropping a directory from a file management application onto an empty space on the activities list window 200. For example, the new activity tag uses the directory name or at least some characters from that directory name. This process associates all files in the directory with the activity tag. In this way, all the files in the particular directory may be accessed using the activity tag. In some embodiments it is possible to select any collection of files, from a single or multiple directories and drag and drop that collection onto the empty space on the activities list window 200. The new activity tag can be automatically created from the name of the first file in the list and changed by the user as needed.

In some embodiments it is possible to drag and drop one or more files or directories onto an activity tag in the activity list window 200 in order to associate the file(s) and/or directories with that activity tag.

Figure 7:
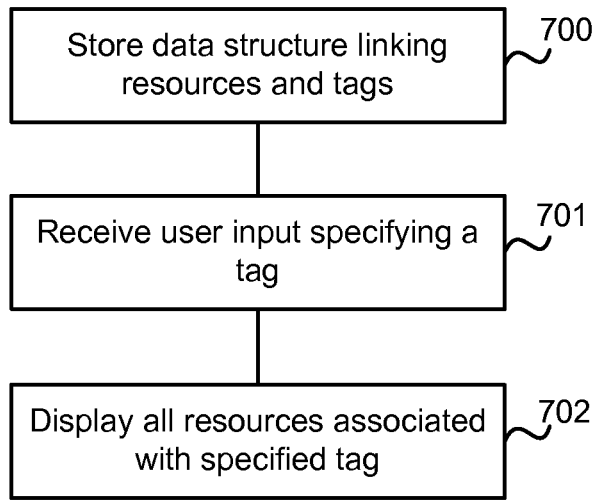
FIG. 7 is a flow diagram of an example method at an activity management system.

FIG. 7 is a block diagram of an example method at the activity management system 100 of FIG. 1. A data structure is stored which links resources and tags (block 700). If user input is received specifying a tag (block 701) the activity management system displays all resources associated with the specified tag (block 702) and optionally, which have stored state information which meets specified criteria. For example, these are displayed in the carousel window 300 of FIG. 3. In order to activate a particular activity the user may then simply select a resource from the carousel window 300. To switch between multiple activities a user is able to select resources using the activity combo-box or to select activities in the activity list window 200.

A graphical user interface is provided that enables users to create tags, associate tags with resources, remove associations between tags and resources, and display resources as a result of user input specifying tags.

In some embodiments a graphical user interface component is provided that is linked to an application window. This component provides the toolbar embodiments mentioned above.

Also, if a resource such as a document is displayed then information about any tags associated with that resource is displayed in conjunction with the displayed resource. For example, this is achieved using the toolbar of FIG. 6.

Figure 8:
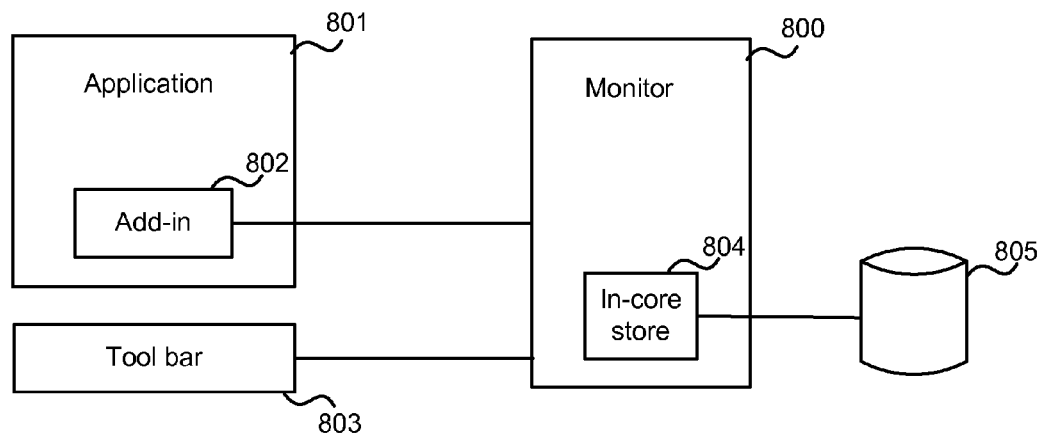
FIG. 8 is a schematic diagram of an activity management system.

FIG. 8 is a schematic diagram of another example of an activity management system. It comprises a monitor 800 having an in-core store 804, at least one application add-in 802, and a toolbar 803. Also shown in FIG. 8 are an application 801 and a database 805 which are not part of the activity management system but which are shown for clarity.

The monitor is a software application which is able to display all activity/resource associations independently of any particular resource. For example, the monitor provides user interface elements comprising: the activity list window 200, the resource carousel, the object list window and the object metadata and thumbnail windows described above. The monitor may also provide one or more toolbars (for example, see FIG. 6) as described in more detail below which are also referred to as user interface elements.

The monitor maintains an in-memory data structure 804 (which is an example of the data structure 102 of FIG. 1). In an embodiment, all the user interface elements are bound to this data structure such that changes in internal data stored at the data structure automatically propagate to most of the user interface elements. Because the activity management system displays the same content in more than one location (for example, the same activity tag lists may appear in several toolbars as well as in the activity list window 200) this simplifies the task of keeping all those user interface elements consistent. In some embodiments the toolbars 803 are part of the monitor process and so they benefit from updating via the same data binding mechanism.

In some embodiments the data structure 804 is an in-core copy made from data stored at a persisted database 805. In these embodiments, when the monitor starts it builds the data structure 804 from the persisted database 805. When a change is made to the data structure 804 this is propagated to the database 805.

As mentioned above, the monitor provides one or more toolbars 803. Each toolbar is associated with an application window. A toolbar is a user interface element which provides the functionality described above with reference to FIG. 6. In order to provide co-ordination between a toolbar and its associated application window an application add-in 802 may be provided in the associated application.

In some embodiments an application add-in is arranged to detect movement of a window of that application on a display screen. If movement is detected the add-in is arranged to send a message to the monitor 800 to request the appropriate tool bar 803 be moved so that it is positioned below the application window. However, it is not essential for the add-in to provide this ability. A global mechanism may be used as described below.

In some embodiments an application add-in is arranged to intercept any window maximization process occurring at a window of the application. It sends dummy information to the application about the size of the display screen in order that some space on the display is reserved for the toolbar 803. However, it is not essential for the add-in to provide this ability. A global mechanism may be used as described below.

In some embodiments an application add-in is arranged to extract state information about any resource displayed in a window of the application. For example, this information may be a page number at which a document is opened, or an email in an email thread that is being viewed. The information may also be a time at which the display is made, whether the window is minimized or maximized, or other state information such as screenshots. The extracted state information is sent by the add-in to the monitor 800 for storing at the data structure 804.

In some embodiments an application add-in is arranged to receive request messages from the monitor 800 requesting that the display of the application window is modified in some way. For example, in applications in which the main window is able to display multiple resources a particular resource may be brought to the fore (for example, switching to a particular tab in an internet browser application). In other examples, the display may be modified to present a resource in a particular view or at a particular page.

Communication between the add-in 802 and the monitor 800 is achieved in any suitable manner. For example, using an inter-process link which may be TCP (transport control protocol) based. The inter-process link is selected such that latency issues are taken into account. For example, to prevent or minimize the risk of a displayed resource changing between the point at which a thumbnail is requested by the monitor 800 and the time at which a screenshot is taken by the add-in 802.

Figure 9:
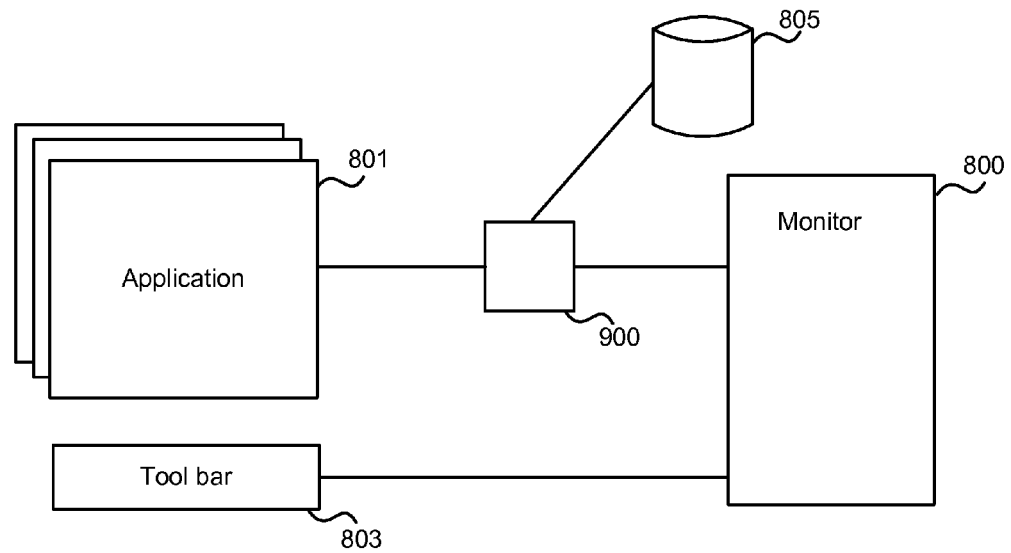
FIG. 9 is a schematic diagram of another activity management system.

In the examples discussed with reference to FIG. 8 add-in modules 802 are used for each individual application. This may reduce the impact on the operating system of the computer at which the activity management system is provided. In other embodiments a global mechanism 900 is provided (see FIG. 9). In this case, much of the functionality of the add-in modules 802 is put into the global mechanism 900 and each of the applications 801 is in communication with the global mechanism 900.

In other embodiments a file management application is modified to enable the use of tags such as activity tags. For example, when a user right-clicks a file or a directory in a file management application, a context menu is presented. This context menu comprises information about activity tags associated with the file or directory and enables a user to access resources by activity tag. For example, this is provided using an add-in to the file management application. This add-in may interrogate the data structure 804 directly and send messages to the monitor 800.

In some embodiments the ability to drag and drop files or directories from a file management application to the activity management system is provided. This may be implemented by providing drop handlers at the monitor 800 which respond to dropped files or directories and create or add to activities as a result.

Figure 10:
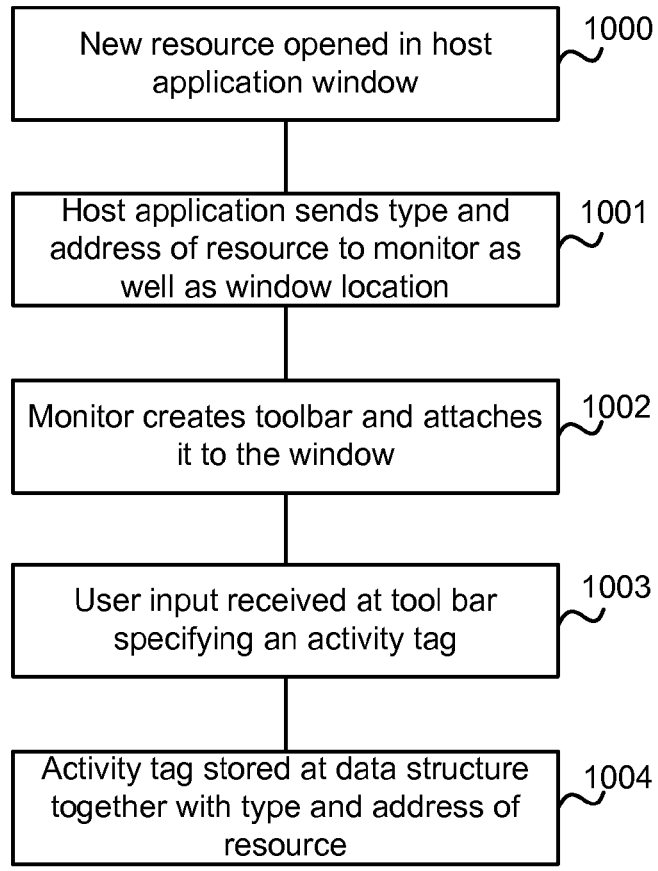
FIG. 10 is a flow diagram of an example method of tagging a resource.

FIG. 10 is a flow diagram of an example method of associating a resource with an activity tag. Suppose we create a new resource by for example, opening a new text document in a host application such as a word processing application (step 1000 of FIG. 10). The activity management system displays a toolbar in conjunction with the window displaying the text document. For example, the toolbar may be displayed as if it is attached to the host application window. An add-in at the word processing application sends (step 1001) information to the activity management system to indicate that a window is being opened and giving the location of that window. Other information is provided by the add-in to the activity management system such as the type and address of the text document. For example, the type may be "word processing application X" and a file path. The address may be any unique identifier that the host application may use to reopen the text document. The activity management system responds by displaying (step 1002) the toolbar. The activity management system notifies the toolbar of the text document type and address.

A user selects (step 1003) an activity tag from the activity list in the combo-box and this activity tag is associated with the word processing document. The activity tag information is sent from the toolbar to the monitor. This information is stored (step 1004) in the data structure together with the type and address information for the resource in order to create the association.

It is not essential for a resource to be open in a host application window in order to associate a tag with that resource. For example, in the context of file system browsing, it is possible to tag a resource without opening that resource.

In another example, a user opens a resource in a host application window and the resource already has one or more associated tags. In this case, the add-in sends the resource type and address to the monitor. The monitor displays a toolbar and presents the associated tags on the toolbar. The monitor also updates the state information for the resource.

Examples of messages or calls made from an application add-in to the monitor are now given:

Application start/stop—when the host application starts or stops the add-in informs the monitor in order that the monitor may initialize or shutdown the toolbar as appropriate.

Window creation/deletion—when the host application creates or deletes a window the add-in informs the monitor. The monitor is then able to create and attach a toolbar if required (or delete the toolbar).

Resource load/unload—when the host application loads a resource into a window which has an activity management toolbar the resource type and address is sent by the add-in to the monitor. When the host application unloads a resource from a window which has an activity management toolbar, the add-in informs the monitor. The toolbar is then updated to remove the activity tag display for that resource.

Resource change events—when a change event occurs at a resource displayed in a host application window, the add-in informs the monitor. For example, these events may be a document save, a document print or other event. The monitor is able to record these events.

Examples of messages made from the monitor to an application add-in are now given:

Open—the monitor is able to send a call to the application add-in to restore all resources (of that application) that were open when the activity was last active. This call may include state data for the resources in order that they may be restored in the appropriate state.

Close—the monitor is able to send a call to the application add-in to cause all resources (of that application) for a particular activity that are not associated with another current activity to be closed.

Hide—the monitor is able to send a call to the application add-in to hide resources rather than closing them to enable fast switching between activities.

Request thumbnail and metadata—the monitor is able to send a request to the application add-in for a thumbnail and metadata of a specified resource or group of resources.

In the examples described above toolbars are described which are user interface elements provided by the activity management system. These toolbars attach onto host application windows. However, in other embodiments, the functionality of such a toolbar is provided within the host application itself.

In some embodiments the tags and/or state information are stored within the resources themselves as well as within the core linking data structure (102). In this way, if the resource is moved the tags and/or state information always remain with the resource. In an embodiment, a tag and/or state information is stored as standard metadata in a resource. For example, specially formatted strings may be added to keywords fields in standard metadata parts of some resources. These specially formatted strings represent activities. An add-in provided in an application may be arranged to update the metadata to add or delete activities as required.

In some embodiments provision is made to enable activities to be shared. For example, all resources associated with a particular activity tag may be copied automatically into a single directory together with an automatically generated description of how the resources relate to each other. This directory may then be archived or sent to others, or otherwise shared.

Figure 11:
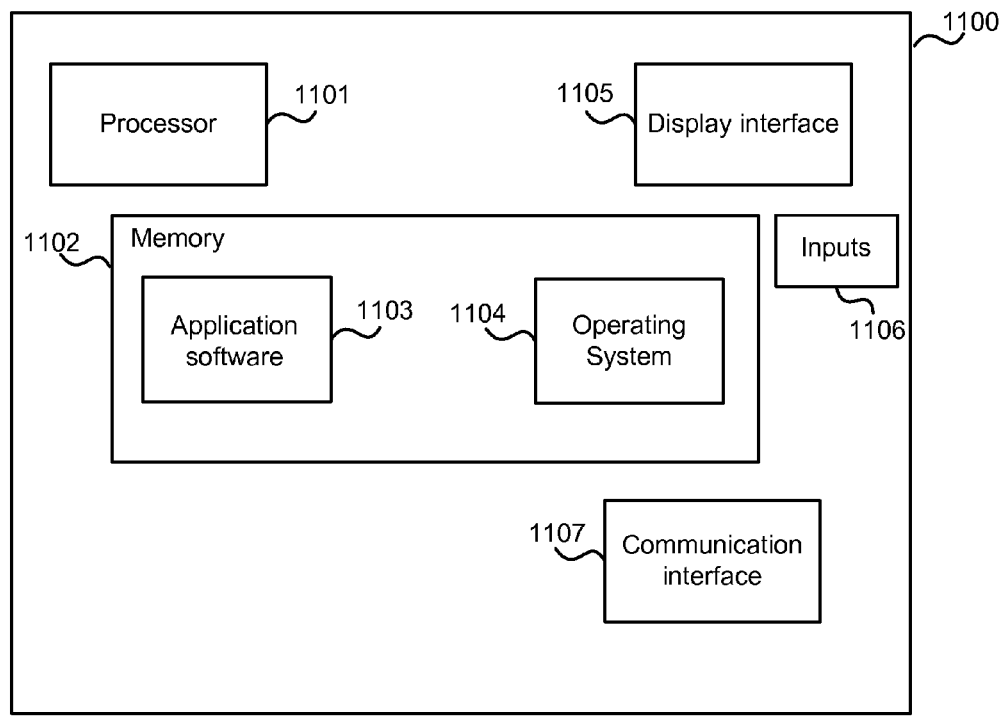
FIG. 11 illustrates an exemplary computing-based device in which embodiments of an activity management system may be implemented.

FIG. 11 illustrates various components of an exemplary computing-based device 1100 which may be implemented as any form of a computing and/or electronic device, and in which embodiments of an activity management system may be implemented.

The computing-based device 1100 comprises one or more inputs 1106 which are of any suitable type for receiving media content, Internet Protocol (IP) input, activity tags, activity state information, resources or other input. The device also comprises communication interface 1107 to enable the device to communicate with one or more other entity using any suitable communications medium.

Computing-based device 1100 also comprises one or more processors 1101 which may be microprocessors, controllers or any other suitable type of processors for processing computing executable instructions to control the operation of the device in order to provide an activity management system. Platform software comprising an operating system 1104 or any other suitable platform software may be provided at the computing-based device to enable application software 1103 to be executed on the device.

The computer executable instructions may be provided using any computer-readable media, such as memory 1102. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 1105 is provided to control a display device to be used in conjunction with the computing device. The display system may provide a graphical user interface, or other user interface of any suitable type.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of associating resources comprising:
   at a memory, storing a plurality tags, each tag being associated with a computer activity performed by a user at a device;
   providing a user interface module arranged to enable a user to perform at least one of assigning data directly to at least one of the plurality of tags or assigning at least one of a plurality of resources to at least one of the plurality of tags;
   for each resource and tag combination, storing resource state information comprising information about a context in which the resource has been used or is being used in the computer activity; and
   copying all resources associated with a tag into a single directory such that each of the plurality of tags containing an assigned resource has an associated directory and, for each directory, automatically generating a description of how the resources in the directory relate to each other, the directory being arranged for sharing with other users.

2. A method as claimed in claim 1, wherein at least some of the resources are heterogeneous.

3. A method as claimed in claim 1, further comprising accessing the plurality of resources from stored locations, at least two resources being separately stored at different computing environments.

4. A method as claimed in claim 1, further comprising providing a user interface module being arranged to enable the user to tag a resource without opening the resource using a software application.

5. A method as claimed in claim 1, further comprising:
   storing a data structure holding a reference to each of the plurality of resources;
   providing a user interface module arranged to receive a user input specifying one of the plurality of tags; and
   displaying, at a display portion of the device, at least two resources referenced in the data structure which are associated with the specified tag and the respective resource state information of the displayed at least two resources.

6. A method as claimed in claim 1, further comprising providing a user interface module arranged to enable the user to access and manage the plurality of tags, the user interface module comprising a toolbar arranged to be attached to a window of a software application used to perform a computer activity.

7. A method as claimed in claim 1, further comprising providing a user interface module arranged to enable the user to access the plurality of resources assigned to a tag, the user interface module comprising a toolbar arranged to be attached to a window of a software application used to perform a computer activity.

8. A method as claimed in claim 1, further comprising providing a user interface module arranged to enable the user to switch between a first computer activity and a second computer activity by selecting a first tag or a second tag.

9. A method as claimed in claim 1, further comprising providing a user interface module arranged to enable the user to switch between a first set of one or more resources associated with a first computer activity and a second set of one or more resources associated with a second computer activity, the user interface module being integral with a software application used at a display portion of the device.

10. A method as claimed in claim 5, further comprising storing tag types in the data structure for each of the plurality of tags, whereby each tag has at least one type.

11. A method as claimed in claim 10, further comprising providing a user interface module arranged to enable the user to access and manage the plurality of tags by tag type.

12. A method as claimed in claim 1, further comprising storing metadata associated with each of the plurality of tags.

13. A method as claimed in claim 12, wherein the metadata comprises historical information about the respective tag and its assigned set of one or more resources.

14. A method as claimed in claim 12, wherein the metadata comprises information about relationships among resources assigned to the respective tag and relationships the respective tag has with other tags.

15. A method as claimed in claim 10, wherein at least one tag type indicates shared resources, the shared resources being stored at a plurality of disparate locations.

16. A method as claimed in claim 1, further comprising providing a persistence mechanism whereby at least one of the resources is persisted, the at least one persisted resource being selected according to tags assigned to the at least one persisted resource.

17. A method as claimed in claim 1, further comprising automatically selecting at least one of the plurality of tags to assign to at least one of the plurality of resources.

18. A method as claimed in claim 1, further comprising suggesting at least one of the plurality of tags to the user for manual assignment to at least one of the plurality of resources.

19. A system comprising:
 a processor;
 a memory, coupled to the processor, that stores:
  a plurality of tags, each tag having at least one of data assigned directly to the tag or at least one of a plurality of resources assigned to the tag, each tag being also associated with an activity or task implemented on the system;
  for each resource and tag combination, resource state information that includes a context in which the resource has been used or is currently being used for the activity or the task implemented on the system; and
  for each tag containing at least one resource, a copy of all resources associated with the tag in a single directory and an automatically generated description of how the resources in the directory relate to each other, the directory being arranged for sharing with other users;
 a user interface module being arranged to:
  enable a user to access and manage one or more of the plurality of tags in conjunction with a selected activity or a selected task; and
  display the one or more resources associated with the selected activity or the selected task and the respective resource state.

20. One or more computer-readable storage media with device-executable instructions configured to perform acts comprising:
 storing a data structure holding references to a plurality of resources;
 storing a plurality of tags, each tag having at least one of data assigned directly to the tag or at least one of the plurality of resources assigned to the tag, each tag being also associating at least one of the plurality of resources with a computer activity at a device;
 copying all resources associated with a tag into a single directory such that each of the plurality of tags containing an assigned resource has an associated directory and, for each directory, automatically generating a description of how the resources in the directory relate to each other, the directory being arranged for sharing with other users; and
 providing a user interface module arranged to allow a user to access and manage one or more of the plurality of tags to switch from a first computer activity to a second computer activity.

* * * * *